United States Patent [19]
Morrill

[11] 3,986,062
[45] Oct. 12, 1976

[54] STATOR ASSEMBLY FOR TWO-POLE, SHADED POLE MOTOR

[76] Inventor: Wayne J. Morrill, 3448 S. Washington Road, Fort Wayne, Ind. 46804

[22] Filed: Jan. 31, 1975

[21] Appl. No.: 546,088

[52] U.S. Cl. .............................. 310/172; 310/184
[51] Int. Cl.² ................................. H02K 17/10
[58] Field of Search .......... 310/216, 172, 254, 258, 310/259, 269, 179, 182, 183, 184, 185, 186, 187, 208, 211; 308/208, 223

[56] References Cited
UNITED STATES PATENTS

| | | | |
|---|---|---|---|
| 2,340,669 | 1/1944 | Lange | 310/182 |
| 2,366,387 | 1/1945 | Crise | 318/208 |
| 2,479,329 | 8/1949 | Ellis | 310/216 |
| 2,567,976 | 9/1951 | Spinasse | 310/172 |
| 2,946,941 | 7/1960 | Jin | 318/223 |
| 3,293,467 | 12/1966 | Favre | 310/216 |
| 3,626,219 | 12/1971 | Lease | 310/259 |
| 3,826,960 | 7/1974 | Broadway | 318/223 |

*Primary Examiner*—R. Skudy

[57] ABSTRACT

A stator assembly for a two-pole, shaded pole motor which comprises a stator core member having four salient pole pieces each having a shank portion and a pole face portion. An opposite two of the poles have shading coils thereon, the other two poles being unshaded. A field coil is wound directly on the shank portion of each of the pole pieces, one pair of coils respectively on an adjacent two of the pole pieces being connected so that upon energization thereof, the two pole pieces are polarized in the same sense, the remaining pair of coils on the other two pole pieces being connected so that upon energization, the other two pole pieces are polarized in the opposite sense.

7 Claims, 1 Drawing Figure

STATOR ASSEMBLY FOR TWO-POLE, SHADED POLE MOTOR

BACKGROUND OF THE INVENTION

1. Field of the Invention

This invention relates generally to stator assemblies for two-pole dynamoelectric machines, and more particularly to a stator assembly for a two-pole, shaded pole motor.

2. Description of the Prior Art

Conventional stator assemblies for two-pole dynamoelectric machines have comprised two field coils each embracing one or more stator core member poles or teeth. Two-pole stators, particularly those having salient pole pieces and in the smaller frame sizes, have been difficult to machine-wind by reason of the large span of the coils. For this reason, it has been common practice to prewind the coils for two-pole machines and to handplace them on the stator core member; however, in the particular case of salient pole machines, the prewound coils must be large enough to pass over the entire pole face and thus, require more magnet wire than would be required if the coils were directly wound on the shank portion of the pole pieces. Further, by reason of their large span, it has been necessary to press-back or form the end turns of two-pole windings away from the bore.

It is therefore desirable to provide a stator assembly for a two-pole dynamoelectric machine of the salient pole type in which the field coils can be wound directly on the shank portions of the pole pieces with conventional gun-type coil winding apparatus.

SUMMARY OF THE INVENTION

In accordance with the invention, each pole of a two-pole winding is split into two parts. The resulting four coils can then be wound individually on the four poles of a four-pole stator core member with conventional gun-type winding apparatus designed to wind four-pole machines. By proper connection of the coils, a two-pole winding is provided with the individual coils closely embracing their respective poles thus eliminating hand-placing of coils and forming the end turns.

In its broader aspects, the invention provides a stator assembly for a two-pole dynamoelectric machine which comprises a stator core member having four inwardly extending polar projections respectively having inner ends defining a bore for receiving a rotor member. At least one pair of field coils is provided respectively embracing an adjacent two of the projections, the pair of coils being connected so that upon energization thereof, the two projections are polarized in the same sense.

It is accordingly an object of the invention to provide an improved stator assembly for a two-pole dynamoelectric machine.

Another object of the invention is to provide an improved stator assembly for a two-pole dynamoelectric machine wherein the coils can be machine-wound by a conventional gun-type winding apparatus and the necessity for forming the end turns of the coils away from the bore is eliminated.

A further object of the invention is to provide an improved stator assembly for a two-pole dynamoelectric machine of the salient pole type.

Yet another object of the invention is to provide an improved stator assembly for a two-pole, shaded pole motor.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

The single FIGURE of the drawing is a side elevational view of a stator assembly for a two-pole, shaded pole motor incorporating the invention.

DESCRIPTION OF THE PREFERRED EMBODIMENT

Figure 1:
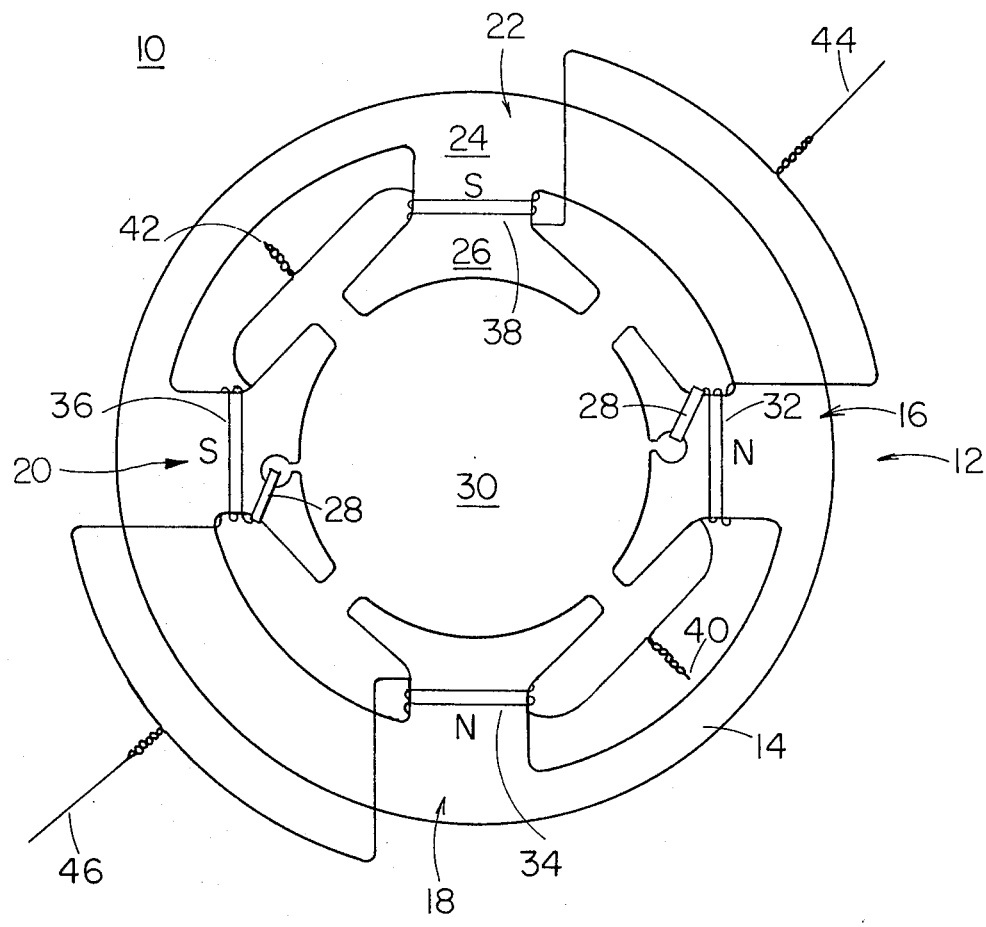

Referring now to the single FIGURE of the drawing, there is shown a stator assembly, generally indicated at 10, for a two-pole, shaded pole induction motor. Stator assembly 10 comprises stator core member 12 formed of a stacked plurality of relatively thin laminations of magnetic material and having yoke portion 14 and four inwardly extending salient pole pieces 16, 18, 20 and 22 each having shank portion 24 and pole face portion 26. Opposite pole pieces 16 and 20 have conventional shading coils 28 thereon, the remaining pole pieces 18, 22 being unshaded. Pole faces 26 mutually define bore 30 for receiving a conventional squirrel cage rotor member (not shown).

Four field coils 32, 34, 36 and 38 are respectively directly wound on shank portions 24 of pole pieces 16, 18, 20 and 22. Field coils 32, 34, 36 and 38 may be wound by conventional gun winding apparatus designed for winding four pole motors. A first pair of coils 32, 34 on two adjacent pole pieces 16, 18 are connected, as at 40 so that, when coils 32, 34 are energized, pole pieces 16, 18 will be polarized in the same sense, such as "North" as shown in the drawing. Similarly, the other pair of coils 36, 38 on the other two pole pieces 20, 22 are connected, as at 42, so that when energized, pole pieces 20, 22 are polarized in the opposite sense, such as "South" as shown in the drawing. The pairs of coils 32, 34 and 36, 38 may be connected in parallel and have external leads 44, 46 connected thereto, as shown.

It will now be seen that the first pair of coils 32, 34 when energized in essence provide one pole of a given polarity, such as North, while the second pair of coils 36, 38 when energized provide the second pole of the opposite polarity, such as South, the two poles being respectively shaded by shading coils 28.

It will now be seen that by properly connecting the four coils 32, 34, 36, 38, a two-pole winding is provided with the coils thereof wound snugly in place on shank portions 24 of the respective pole pieces, hand placing of the coils and pressingback or forming of the end turns being eliminated.

It might be assumed that since two separate coils are employed for each pole, an excessive quantity of magnet wire would be required by reason of the seemingly wasted adjacent coil sides of adjacent coils, i.e., the current in the adjacent sides of adjacent coils, such as 32, 34, flows in opposite directions. However, I have found that the length of wire required for each pair of machine-wound coils is approximately equal to the length of wire required for a single hand-placed coil which must be large enough to be slipped over an entire pole face.

While there have been described above the principles of this invention in connection with specific apparatus, it is to be clearly understood that this description is made only by way of example and not as a limitation to the scope of the invention.

What is claimed is:

1. A stator assembly for a two-pole dynamoelectric machine comprising a stator core member having four inwardly extending polar projections respectively having inner ends defining a bore for receiving a rotor member, and at least one pair of field coils respectively snugly embracing an adjacent two of said projections, said pair of coils being connected so that upon energization thereof, said two projections are both polarized in the same sense.

2. The stator assembly of claim 1 wherein each of said polar projections is a salient pole having a shank portion and a pole face portion, said coils being wound directly on the respective shank portions.

3. The stator assembly of claim 1 wherein there is a second pair of field coils respectively snugly embracing the other two of said projections, said second pair of coils being connected so that energization thereof, said other two projections are both polarized in a sense opposite the sense of the said first-named two projections.

4. The stator assembly of claim 1 wherein said machine is a shaded pole motor, an opposite two of said projections having shading coils thereon, the remaining two projections being unshaded.

5. The stator assembly of claim 4 wherein each of said polar projections is a salient pole having a shank portion and a pole face portion, said one pair of coils being wound directly on the respective shank portions of two adjacent projections, there being a second pair of coils respectively wound directly on the shank portions of the other two projections, said second pair of coils being connected so that upon energization thereof, said other two projections are both polarized in a sense opposite the sense of the said first-named two projections.

6. The stator assembly of claim 1 wherein the one pair of field coils are connected in series between two external leads.

7. The stator assembly of claim 3 wherein the one pair of field coils are connected in series and the second pair of field coils are connected in series with the series pairs being connected in parallel between two external leads.

* * * * *